Figure 1:
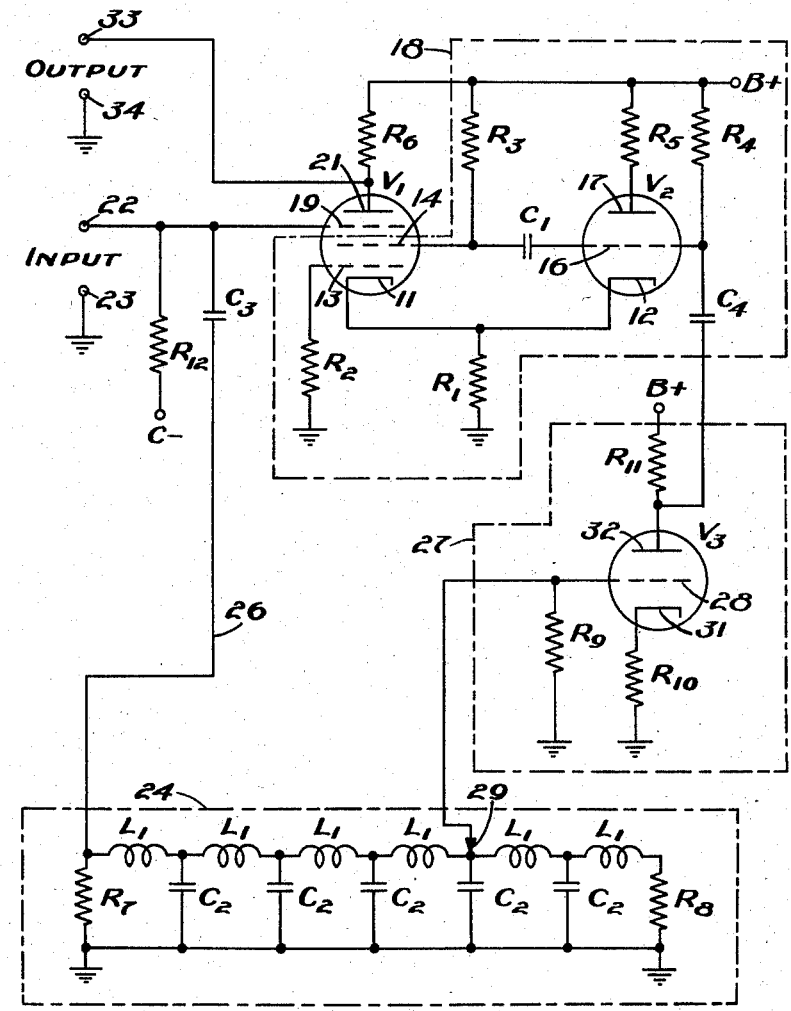

July 7, 1959

H. F. STILLWELL 2,894,127

PULSE DECODING MEANS

Filed Oct. 26, 1954

2 Sheets-Sheet 1

INVENTOR
HARRY F. STILLWELL
By
*Marvin Moody*
ATTORNEY

United States Patent Office 2,894,127
Patented July 7, 1959

2,894,127

PULSE DECODING MEANS

Harry Folsom Stillwell, Cedar Rapids, Iowa, assignor to Collins Radio Company, Cedar Rapids, Iowa, a corporation of Iowa Application October 26, 1954, Serial No. 464,692

6 Claims. (Cl. 250—27)

This invention relates generally to pulse decoding means and particularly to a circuit which provides an output of a single pulse for each two pulses received consecutively with a predetermined time-spacing.

It is often required to encode information so that only desired receiving parties will be able to discern it. This invention concerns the detection of information which is transmitted in pulse form and which is encoded by varying the time-spacing of the pulses, wherein the information exists only in pulses having a predetermined time-spacing with their respective preceding pulses. The information is extracted only from the second of each pair of properly time-spaced pulses, because the first pulse of the pair acts only as a conditioning pulse. Thus, one output pulse is provided by the invention for each pair of properly spaced input pulses received.

It is understood, however, that in this invention the last and information-bearing pulse of one pair of pulses may be the first or conditioning pulse of the next pair of pulses. Hence, three pulses which have the required time spacing may comprise two pairs of pulses; and mathematically speaking, $(n+1)$ pulses which have the predetermined time-spacing comprise a series having $n$ pair of pulses in such an encoding system. Each series of information pulses is initiated and terminated by a time-spacing either greater or less than the predetermined time-spacing.

The information may be provided to the pulses that are properly spaced by modulating both pulses or only the second pulse of each pair. Amplitude modulation, pulse width modulation, or any type of modulation that can be applied to a single pulse may be used.

It is therefore an object of this invention to provide a circuit that detects paired pulses by their time-spacing.

It is another object of this invention to discriminate among a series of transmitted pulses which have varying time-spacings and to select only the second pulse of pulse pairs having a predetermined time-spacing.

It is still another object of this invention to provide a circuit which filters out information pulses from a series of transmitted pulses where each information pulse is preceded by another pulse with a predetermined time-spacing.

The invention includes at least a pair of electron control means that may be conventional electron tubes or transistors, wherein some, but not all, of the control elements of one of the electron control means are connected to the control elements of the other electron control means to form a single-shot multivibrator. The electron control means with the excess of elements is connected as the normally non-conducting electron means of the multivibrator, and the other electron means is accordingly the normally conducting means. The term "normally" is used herein to designate when the invention is in an operative state but is not receiving an input signal.

Pulse delay means, which may be conventional, is connected between one of the excess control elements of the normally non-conducting electron means and one of the control elements of the normally conducting means. The delay means delays the pulses by an amount that is substantially equal to a required predetermined time-spacing between pulse pairs. The input signal pulses are received on the excess control element which is connected to the delay means; and the output of the invention is provided at another excess control element of the normally non-conducting electron means.

Figure 2:
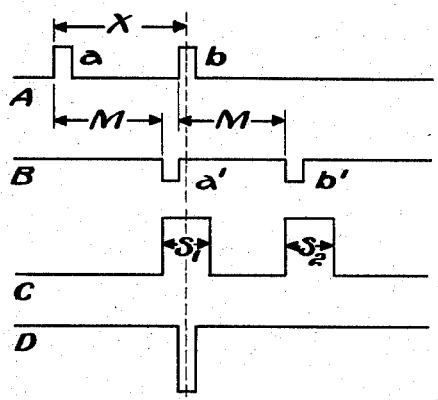
Figure 3:
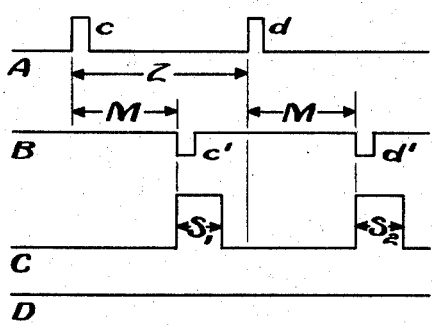
Figure 4:
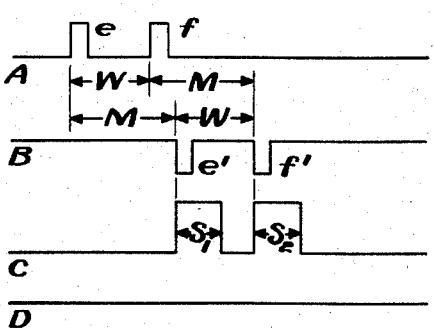

Further objects, advantages and features of this invention will become apparent to a person skilled in the art upon further study of this specification and drawings; in which, Figure 1 is a schematic diagram of an embodiment of the invention;

Figures 2A, B, C, and D illustrate the operation of the invention when a pair of pulses are received with correct time-spacing;

Figures 3A, B, C, and D illustrate the operation of the invention when a pair of pulses are received with a time-spacing that is too large; and, Figures 4A, B, C, and D illustrate the operation of the invention when a pair of pulses are received with a time-spacing that is too small.

Now referring to the invention in more detail, Figure 1 shows a schematic diagram of a chosen embodiment. It has a first electron control means $V_1$ with at least five control elements, represented herein by a pentode tube; and the invention also has a second electron control means $V_2$ with at least three control elements, represented herein by a triode tube. The cathode 11 of pentode $V_1$ is connected to the cathode 12 of triode $V_2$, and a biasing resistor $R_1$ is connected on one side of cathodes 11 and 12 and on the other side to ground. A grid-leak resistor $R_2$ is connected between ground and the control grid 13 of pentode $V_1$. A capacitor $C_1$ is connected between the screen grid 14 of pentode $V_1$ and the grid 16 of triode $V_2$.

A third resistor $R_3$ is connected between a plate supply voltage, designated generally as B-plus and the screen grid 14 of pentode $V_1$, and a fourth resistor $R_4$ is connected between the B-plus supply and the grid 16 of triode $V_2$. A fifth resistor $R_5$ connects between the B-plus voltage and the plate 17 of triode $V_2$.

The elements thus far described comprise a single-shot multivibrator which is enclosed by dashed lines designated by reference numeral 18 in Figure 1.

The suppressor grid 19 and plate 21 of pentode $V_1$ are additional control elements required by the invention but do not constitute a part of a single-shot multivibrator 18. A sixth resistor $R_6$ is provided which is connected on one side to the B-plus supply and on the other side to plate 21 of pentode $V_1$.

A pair of input terminals 22 and 23 are provided with terminal 22 connected to suppressor grid 19 and terminal 23 connected to ground. A negative direct voltage supply, designated generally as C-minus, is also connected to suppressor grid 19 throuh an isolating resistor $R_{12}$.

Delaying means 24 (also enclosed in dashed lines in Figure 1) may be any suitable type and is shown herein as a conventional delay line composed generally of series inductances $L_1$ and shunt capacitances $C_2$ connected in tandem with matched load resistors $R_7$ and $R_8$ connected to the respective ends. The input end of delay line 26 is connected through blocking capacitor $C_3$ to suppressor grid 19.

A polarity inverting amplifier 27, which inverts the polarity of pulses it receives and may be any conventional type, includes a triode $V_3$ that has its grid 28 connected to an adjustable tap 29 which receives the output of the delay line. A grid-leak resistor $R_9$ is connected between grid 28 and ground; while a biasing resistor $R_{10}$ is connected between cathode 31 and ground. The plate 32 of the tube $V_3$ is connected to the B-plus supply voltage through a plate resistor $R_{11}$. The polarity inverted output of amplifier 27 is connected to grid 16 of triode $V_2$ through a blocking condenser $C_4$.

The output of the circuit is provided at a pair of terminals 33 and 34. Terminal 33 is connected to plate 21 of pentode $V_1$ and the other terminal 34 is connected to ground.

It is understood that any system of connection that will provide a single-shot multivibrator and that will leave an excess of control elements in the normally non-conducting tube may be used. The multivibrator system utilized in the selected embodiment of the invention is hereafter explained:

Triode $V_2$ is the normally conducting member of the multivibrator while pentode $V_1$ is the normally non-conducting member. The normal condition of conduction and non-conduction for tubes $V_1$ and $V_2$ in this embodiment is maintained by normally biasing the control grid of triode $V_2$ above cutoff and the control grid of pentode $V_1$ below cutoff. It is noted that control grid 13 of pentode $V_1$ is grounded through grid-leak resistor $R_2$ while the control grid 16 of triode $V_2$ is connected to the positive B-plus supply through resistor $R_4$. Cathode resistor $R_1$ is selected so that the plate current of triode $V_2$, which passes through resistor $R_5$, provides a voltage drop which is sufficiently large to bias pentode $V_1$ below cutoff.

Multivibrator 18 is actuated when a negative pulse is received on grid 16 of triode $V_2$; and the negative pulse must have sufficient amplitude to drive grid 16 below cutoff for an instant. However, positive input pulses are received across input terminals 22 and 23 and are transmitted through blocking condenser $C_3$, delay line 24, adjustable tap 29, amplifier 27 (where they are inverted to negative pulses), and through capacitor $C_4$ to control grid 16 of triode $V_2$ where they actuate multivibrator 18. If the output of delay line 24 is weak, the pulses are sufficiently increaesd in amplitude by the amplifier to trigger the multivibrator.

In multivibrator 18, the instant that triode $V_2$ is driven below cutoff by a negative pulse, plate current is discontinued through the triode $V_2$ and thus is discontinued through biasing resistor $R_1$ which is also the biasing resistor for pentode $V_1$. Hence, at this instant the grid voltage of pentode $V_1$ changes from below cutoff to above cutoff which begins conduction of pentode $V_1$ only in regard to its elements included in multivibrator 18. It is emphasized that, at this instant, pentode $V_1$ does not conduct in the manner of an ordinary pentode, which conducts from cathode to plate, but pentode $V_1$ now conducts only from cathode 11 to screen grid 14. Pentode plate 21 remains non-conducting because the C-minus voltage on suppressor grid 19 prevents electrons from reaching it. Hence, no conduction occurs through plate resistor $R_6$ due to actuation of multivibrator 18.

The three multivibrator elements of pentode $V_1$ maintain conduction for a period that is determined by the time constant of capacitor $C_3$ and grid resistors $R_2$ and $R_3$. Generally, the time constant is chosen so that the period of conduction is greater than the width of the input pulses received by the circuit. It is noted that no output is provided at output terminals 33 and 34 by actuation of multivibrator 18 because no electrons are permitted to reach plate 21.

As mentioned above, the invention provides an output when a pair of consecutive pulses are received which have a predesignated time-spacing. The embodiment of Figure 1 is designed to receive positive input pulses. Figure 2A shows such a pair of pulses $a$ and $b$ that have the required coded time-spacing, designated as X. Tap 29 is adjusted so that the period of time delay for a pulse traveling from input terminal 22 to triode grid 16 is equal approximately to a period M which is equal to time-spacing X minus one-half of the actuation time S of the multivibrator. Pulse $a$ is received first at the input terminals 22 and 23 where it has no effect on pentode $V_1$ since its cathode 11 is biased below cutoff by the voltage across resistor $R_1$. However, after a period M, pulse $a$ is inverted to form pulse $a'$ (see Figure 2B) which is received on grid 16 of triode $V_2$ to actuate the multivibrator and place pentode $V_1$ in a conducting state for a short period of time $S_1$ (see Figure 2C), which is a function of the time constant mentioned above.

Also, after the period X and when pentode $V_1$ is partially conducting second positive pulse $b$ is received at the input terminals and on suppressor grid 19. Pulse $b$ coincides in time with the center of the conduction period $S_1$ for the multivibrator elements in pentode $V_1$, because of the choice of time relationships between periods X and M as defined above. Pulse $b$ drives suppressor grid 19 sufficiently positive to permit electrons to reach plate 21 for its duration. These electrons pass through plate resistor $R_6$ and cause the voltage on plate 21 to drop from the B-plus voltage to some lower value for the period of pulse $b$. Hence, a single negative output pulse shown in Figure 2D is received at output terminals 33 and 34.

After a second period M, second pulse $b$ will be received in an inverted manner (see pulse $b'$ in Figure 2B) on triode grid 16 to actuate the multivibrator again for a period $S_2$ which is equal to period $S_1$; but there is no output from the invention because no third pulse arrives on suppressor grid 19 during the second multivibrator actuation. However, a third input pulse following second input pulse $b$ by a period X would provide a second output pulse.

The output pulses of the invention will be replicas of the second pulse of each pair of properly spaced positive input pulses. Hence, information carried by the input signal may be provided by modulating the second pulse of each pair. However, the pulse coding system is rendered more immune to noise when both pulses of each pair are modulated. Then a noise pulse, preceding the first pulse of a coded pair by a time-spacing X with sufficient amplitude to actuate the multivibrator, will permit the first coded pulse to pass and to carry with it information.

It is noted that the controlling factor for providing the single output pulse when a pair of positive pulses is received is that the second input pulse $b$ coincide in time with the actuation of the multivibrator by the delayed first pulse $a'$. Furthermore, when pulse $b$ coincides with the center of the actuation period an amount of either positive or negative error in the time-spacing of coded pulses is permitted. However, when the spacing of the pulses substantially differs from a time X there will be no output provided at terminals 33 and 34; and this will be the case whether the spacing is substantially greater than X or whether the spacing is substantially less than X.

The case is shown in Figure 3A where a pair of input pulses $c$ and $d$ have a time-spacing Z that is substantially greater than X, the required time-spacing. The first pulse $c$ will be delayed for a period M by the delay line and will provide an inverted pulse $c'$, shown in Figure 3B, on the grid of triode $V_2$ to actuate the multivibrator and to provide pentode conduction for period $S_1$ shown in Figure 3C. However, during period $S_1$ of conduction by pentode $V_1$, it is noted that there is no pulse received on suppressor grid 19; but second input pulse $d$ is received after pentode $V_1$ ceases conduction and hence has no effect upon the output, since at that time pentode $V_1$ is biased below cutoff.

A second delayed and inverted pulse $d'$ is received at triode grid 16 after a period M from the reception of input pulse $d$; and pulse $d'$ will actuate the multivibrator for a period $S_2$ shown in Figure 3C. But again it is noted that there is no input pulse received which coincides in time with multivibrator actuation $S_2$; hence, no output is provided. Accordingly, it is apparent that the input pulses which are spaced substantially greater than period X do not provide any output at terminals 33 and 34.

Next is the case where there are a pair of input pulses $e$ and $f$, shown in Figure 4A, which are time-spaced by a period W that is substantially less than period X. First input pulse $e$ is delayed by delay line 26 to provide a first inverted delayed pulse $e'$, shown in Figure 4B, which actuates the multivibrator for the period $S_1$ shown in Figure 4C. Again, there is no pulse received by suppressor grid 19 during the actuating period; and no output is provided, because second pulse $f$ is received on suppressor grid 19 after time W and is expended before the multivibrator is actuated by delayed pulse $e'$. The second inverted delayed pulse $f'$ is received on triode grid 16 to again actuate the multivibrator for a period $S_2$, shown in Figure 4C; but again there is no input pulse coincident with the actuation, and hence no output pulse. Consequently, it is noted that paired pulses which have a time-spacing of substantially less than X do not provide any output at termnials 33 and 34.

Delay means 24 may be any conventional device, such as the artificial transmission line shown, or may be an active device such as the variable dalay circuit described in Patent No. 2,556,934 to Mulligan, Jr., et al. Multivibrator 18 may be designed to be triggered on any of the other control elements of tube $V_1$ by the output of the delay circuit.

If inverting amplifier 27 were left out of Figure 1 by connecting adjustable tap 29 directly to blocking capacitor $C_4$, the invention would utilize paired pulses having the predetermined spacing, where the first pulse is negative and the second pulse is positive.

It is, therefore, apparent that the invention described above provides a circuit for decoding a pair of pulses which have a predetermined time-spacing.

While a specific embodiment of the invention has been shown and described, various modifications will be obvious to persons skilled in the art which do not depart from the spirit and scope of the invention as defined in the following claims.

What is claimed is:

1. A circuit which provides an output only when pulses with a predetermined time-spacing are received, comprising a single-shot multivibrator having a normally conducting electron control means and a normally non-conducting electron control means, said normally non-conducting control means having additional control elements not utilized by the multivibrator, a first of the additional elements controlling the conduction of a second of the additional elements, the first additional element connected to receive the input pulses, means for delaying the pulses by an amount substantially equal to said time-spacing, said delay means connected between the first additional control element of said non-conducting control means and one of the control elements of the normally conducting electron means, whereby output pulses are provided at the second additional element of the normally non-conducting means when it receives pulses having substantially the predetermined time-spacing.

2. A pulse decoding circuit for providing an output of a single pulse when a pair of input pulses are received with a predetermined time-spacing, comprising a single-shot multivibrator having a normally non-conducting tube having a first grid and an additional grid not part of said multivibrator, said additional grid being adjacent to its plate and connected to receive the input pulses, said one-shot multivibrator also including a normally conducting tube having at least a grid, pulse delay means connected between said additional grid of the normally nonconducting tube and the grid of the normally conducting tube of the multivibrator, pulses received by the grid of said normally conducting tube triggering said multivibrator, coupling means in said multivibrator between said tubes to maintain them in opposite conduction states, said delay means adjusted to delay the pulses by the predetermined time-spacing, the output being taken from the plate of the normally non-conducting tube.

3. A pulse decoding circuit for decoding paired positive pulses having a predetermined time-spacing comprising, a first electron tube having a cathode and plate with at least three grids, a second electron tube having a cathode and plate with at least one grid, the second tube and the cathode and the first and second grids of the first tube connected as a one-shot multivibrator with the second tube normally conducting and the first tube normally non-conducting, a delay line with its input end connected to the third grid of the first tube, an amplifier connected between the output of the delay line and control grid of the second tube, and a resistor connected serially with the plate of the first tube, whereby a pulsed output is received from the plate of said first tube when a pair of pulses are received on its third grid and have a time-spacing equal to the delay of said line.

4. A pulse decoding circuit for providing an output of a single pulse when two consecutive input pulses are received with a predetermined coded time-spacing, comprising a single-shot multivibrator, a normally non-conducting tube of said multivibrator having at least three grids in addition to its plate and cathode, a normally conducting tube of said multivibrator having at least a control grid, the cathode and two adjacent grids of said normally non-conducting tube connected to provide the entire multivibrator operation of that tube, a resistor connected serially with the plate of said non-conducting tube, a delay line connected at its input end to the third grid of the normally non-conducting tube, an inverting amplifier connected between the output of the delay line and control grid of the normally conducting tube, said delay line providing a delay substantially equal to the predetermined time-spacing of coded paired pulses, whereby a decoded output is provided at the plate of the normally non-conducting tube when the coded input is received on the third grid.

5. A pulse decoding circuit comprising, a first electron tube having at least three grids, a second electron tube having at least one grid and having its cathode connected to the cathode of said first tube, a first resistor connected between ground and the common cathode connection of said tubes, a grid-leak resistor connected between ground and the control grid of said first tube to ground the control grid, a capacitor connected between the second grid of the first tube and the grid of the second tube, a plate resistor connected serially to the plate of said second tube, a resistor connected between the plate voltage supply of the tubes and one side of said capacitor, another resistor connected between the plate voltage supply and the other side of said capacitor to complete a single-shot multivibrator comprising said second tube and the cathode, control grid and screen grid of said first tube, an isolated negative unidirectional voltage supply biasing the third grid of said first tube, a plate resistor connected serially to the plate of said first tube, a delay line connected between the third grid of the first tube and the control grid of the second tube, said delay line matched at both ends to prevent reflection at either end, whereby a pair of pulses received on the third grid and having a time-spacing equal to the time of transmission for the delay line will actuate a single pulse output at the plate of the first tube.

6. A pulse-decoding circuit for providing a single output pulse from a pair of spaced received pulses, comprising an electron control means having at least first and second input control electrodes and an output electrode, said electron control means being normally biased below cutoff, a one-shot multivibrator having an input and an output with its output connected to said first input control electrode, a delay line having input and output connection points, means coupling said delay line between said second control electrode of said electron means and the input of said multivibrator, means for transmitting the received pair of pulses simultaneously to the input connection point of said delay line and to said second input control electrode, and the output of said electron control means providing the decoded output of said circuit.

References Cited in the file of this patent

UNITED STATES PATENTS

| | | |
|---|---|---|
| 2,212,967 | White | Aug. 27, 1940 |
| 2,273,090 | Crosby | Feb. 17, 1942 |
| 2,489,302 | Levy | Nov. 29, 1949 |
| 2,492,736 | Custin | Dec. 27, 1949 |
| 2,510,987 | Levy | June 13, 1950 |
| 2,553,284 | Sunstein | May 15, 1951 |
| 2,556,935 | Mulligan et al. | June 12, 1951 |
| 2,577,536 | MacNichol | Dec. 4, 1951 |
| 2,706,810 | Jacobsen | Apr. 19, 1955 |
| 2,778,935 | Ropiequet | Jan. 22, 1957 |
| 2,784,910 | Ghiorso et al. | Mar. 12, 1957 |